United States Patent
Dejong et al.

(10) Patent No.: US 10,229,574 B2
(45) Date of Patent: Mar. 12, 2019

(54) MONITORING LIVING BEINGS

(71) Applicant: KONINKLIJKE PHILIPS N.V., Eindhoven (NL)

(72) Inventors: Eddy Louis Ursula Dejong, Eindhoven (NL); Hassan El Barakat, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 15/507,312

(22) PCT Filed: Sep. 4, 2015

(86) PCT No.: PCT/EP2015/070215
§ 371 (c)(1),
(2) Date: Feb. 28, 2017

(87) PCT Pub. No.: WO2016/034699
PCT Pub. Date: Mar. 10, 2016

(65) Prior Publication Data
US 2018/0047273 A1     Feb. 15, 2018

(51) Int. Cl.
*G08B 21/02*     (2006.01)
*H04L 12/26*     (2006.01)

(52) U.S. Cl.
CPC ..... *G08B 21/0258* (2013.01); *G08B 21/0208* (2013.01); *G08B 21/028* (2013.01); *G08B 21/0277* (2013.01); *G08B 21/0294* (2013.01); *H04L 43/0811* (2013.01)

(58) Field of Classification Search
CPC ............ G08B 21/0258; G08B 21/0208; G08B 21/0277; G08B 21/028; G08B 21/0294; H04L 43/0811
See application file for complete search history.

(56) References Cited

U.S. PATENT DOCUMENTS

| | | |
|---|---|---|
| 5,289,163 A | 2/1994 | Perez |
| 2006/0158336 A1 | 7/2006 | Nourbakhsh |
| 2006/0250255 A1 | 11/2006 | Flanagan |
| 2010/0241018 A1 | 9/2010 | Vogel |

(Continued)

FOREIGN PATENT DOCUMENTS

| | | |
|---|---|---|
| CN | 102073310 A | 5/2011 |
| GB | 2391674 A | 2/2004 |

(Continued)

OTHER PUBLICATIONS www.usa.philips.com/c-p/SCD603_10/avent-digital-video-baby-monitor/overview.

*Primary Examiner* — Leon Flores

(57) ABSTRACT

A system (1) for monitoring living beings, such as persons, pets or livestock comprises a monitoring device (10) for monitoring a living being and a user device (20), such as a smartphone, which devices are arranged for communicating via an internet type connection (40), and a server (30) arranged for communicating with the user device (20) via a further internet type connection (50). The server (30) is provided with a software program for periodically initiating, through a software program in the user device (20), a protocol for testing the internet type connection (40). The system is thereby capable of detecting a loss of the internet type connection (40) between the monitoring device and the user device.

15 Claims, 5 Drawing Sheets

(56) References Cited

U.S. PATENT DOCUMENTS

| | | | |
|---|---|---|---|
| 2011/0267462 A1* | 11/2011 | Cheng | H04N 7/181 348/143 |
| 2012/0239773 A1 | 9/2012 | Blustein | |
| 2013/0107029 A1 | 5/2013 | Knasel | |
| 2013/0182107 A1 | 7/2013 | Anderson | |

FOREIGN PATENT DOCUMENTS

| | | |
|---|---|---|
| GB | 2447459 A | 9/2008 |
| GB | 2505641 A | 3/2014 |
| KR | 0171282 B1 | 3/1999 |
| RU | 249359 C2 | 9/2013 |

\* cited by examiner

MONITORING LIVING BEINGS

This application is the U.S. National Phase application under 35 U.S.C. § 371 of International Application No. PCT/EP2015/070215, filed on Sep. 4, 2015, which claims the benefit of International Application No. 14183562.9 filed on Sep. 4, 2014. These applications are hereby incorporated by reference herein.

FIELD OF THE INVENTION

The present invention relates to monitoring living beings. More in particular, the present invention relates to a device, a system, a method and a software program product for remotely monitoring persons, such as infants, elderly persons, and sick or disabled persons, but also animals, such as pets and livestock.

BACKGROUND OF THE INVENTION

It is well known to monitor persons, such as infants, using a so-called baby monitor or baby alarm. Such known devices typically consist of a baby unit having a microphone and a parent unit having a speaker, thus allowing parents to hear the noises the baby makes when they are not in the baby's immediate vicinity. The baby unit and the parent unit may be connected by wire, but typically have a point-to-point radio connection, in some products allowing two-way traffic so the parents can remotely talk to the baby. Some more advanced models even have a camera in the baby unit, allowing the parents to remotely watch the baby. An example of such an advanced model is the Philips Avent® Digital Video Baby Monitor (www.usa.philips.com/c-p/SCD603_10_avent-digital-video-baby-monitor/overview).

The advent of smartphones has brought baby-sitting apps. These software programs or apps allow the parent unit to be constituted by a smartphone. This is more convenient for the parents as they no longer have to carry a separate parent unit when visiting the neighbors. In addition, the distance between the parent unit and the baby unit is no longer limited to the range of the baby unit's radio transmitter (typically 150 m maximum). When using the internet to connect the baby unit and the parent unit, in principle any distance can be covered.

Using an internet connection instead of a radio connection, however, has the disadvantage that the connection is less reliable. As is well known, internet connections can be lost and Wi-Fi networks can go down without warning. In contrast to radio connections, the loss of an internet connection generally is not detected when using a baby monitor. Most baby monitors only transmit sound when the baby unit detects a sound, so most of the time the parent unit or smartphone will receive no data from the baby unit. The absence of received data is therefore no indication of the malfunctioning of the IP connection. It will be clear that this is undesirable.

United States Patent Application US 2013/0182107 discloses an activity monitoring system which may include a smartphone in and a wireless network camera. The smartphone may periodically communicate, via the internet, with a remote server. The server may alert a user if the communication with the smartphone fails. However, the connection between the wireless network camera and the smartphone is not checked.

SUMMARY OF THE INVENTION

It is an object of the present invention to solve this problem by providing a monitoring system for living beings, such as persons, which uses an internet connection and is capable of detecting a loss of the internet connection. The present invention also provides a method and a software program product for testing and monitoring an internet connection of a living beings monitoring system.

Accordingly, the present invention provides a system for monitoring living beings, comprising:

a monitoring device comprising a microphone for registering sound and a communication unit arranged for communicating via an IP connection, a user device, provided with a first software program for rendering sound which is registered by the microphone of the monitoring device and transmitted via the IP connection, a server arranged for communicating with the user device via a further IP connection, wherein the server is provided with a second software program for periodically initiating, through the first software program in the user device, a protocol for testing the IP connection between the monitoring device and the user device.

In other words, the system of the present invention uses an IP (Internet Protocol) connection for transmitting data from the monitoring device to the user device, and preferably also vice versa. It is noted that the term IP connection is used here to denote an Internet-type connection, typically a connection using the TCP/IP protocol suite. Such a connection may involve one or more of a "Wi-Fi" or WLAN (Wireless Local Area Network) connection, a router, the Internet at large, a mobile telephone (3G and/or 4G) connection, etc.

The user device, which may be constituted by a smartphone, is provided with a first software program (a so-called app) or first set of software programs. One of the functions of this first software program is to render sound received from the monitoring unit, which is capable of converting sound into data that can be sent via the IP connection.

On the server, which typically is a remote server, a second software program (or possibly second set of software programs) is stored and executed. One of the functions of this second software program is to periodically initiate a test of the (first) IP connection between the user device and the monitoring device. The second software program is therefore arranged for periodically starting the first software program in the user device. The second software program may, upon each activation of the first software program, transmit instructions for carrying out the test protocol to the user device via the further (or second) IP connection. However, it is preferred that those instructions are part of the first software program and that the second software program only needs to activate the first software program.

In embodiments of the present invention the server, that is the "back-end", initiates a connection check. It would also be possible for the user device, which may advantageously be constituted by a smartphone, to initiate a connection check. This requires, however, an app running in the background and at the time of writing, not all smartphone makers allow this. In addition, a continuously running app consumes energy and therefore reduces the battery life of the smartphone. Accordingly, in order to provide a system and method which can be used with all brands of smartphones and which preserves the smartphone battery, a server-initiated solution is utilized.

In other embodiments of the present invention the monitoring unit triggers the server to initiate the connection check. To this end, a still further (or third) IP connection may be present between the monitoring unit and the server. The monitoring unit may be arranged to periodically, and/or under certain conditions (for example when detecting sound), trigger the server. To this end, the monitoring unit may be provided with a suitable third software program.

As mentioned above, the first software program of the user device may carry out a connection test protocol. In a first embodiment, the protocol involves:

the user device sending, via the IP connection, a first test signal to the monitoring device, the monitoring device, in response to the first test signal, sending a second test signal to the user device, and the user device, in response to the second test signal, providing a positive status indication and, in the absence of the second test signal within a predetermined time duration, providing a negative status indication.

When no second test signal is received, the protocol may be repeated a number of times.

In a second embodiment, the protocol involves:

the user device sending, via the IP connection, a third test signal to the monitoring device, the monitoring device, in response to the third test signal, producing a test sound, the monitoring device, in response to registering the test sound with its microphone, sending a fourth test signal to the user device, and the user device, in response to the fourth test signal, providing a positive status indication and, in the absence of the fourth test signal within a predetermined time duration, providing a negative status indication.

As in the first embodiment, when no fourth test signal is received, the protocol may be repeated a number of times.

Instead of, or in addition to producing a test sound as in the second embodiment, the monitoring device may, in response to the third test signal, temporarily lower a sound detection threshold. This allows background noise to be detected and to be transmitted to the user device as proof that the system is functioning properly. A third embodiment combines the features of the first and the second embodiments. In a fourth embodiment, the monitoring device may, in response to the third test signal, perform a test without producing a sound. In such a test, the proper functioning of the monitoring device may be determined without using the loudspeaker.

The (first) IP connection between the monitoring device and the user device may be a permanent connection, at least in the sense that it is available all the time. In some embodiments, however, the monitoring device is arranged to discontinue the IP connection between the monitoring device and the user device in the absence of sound to be transmitted. That is, the IP connection may be (temporarily) interrupted. This offers the advantage of reducing any radiation transmitted by the monitoring device if a wireless connection is used. The monitoring device is in such an embodiment preferably arranged for periodically restoring the IP connection to allow the system to be tested. In addition, sounds registered by the monitoring unit may cause the IP connection to be restored. Although the user device could additionally or alternatively be arranged for periodically restoring the IP connection, in smartphones this would typically require an app (software program) running in the background, which some smartphone makers do not allow, as mentioned above.

The present invention also provides a monitoring device for use in the system described above, the device comprising a microphone for registering sound and a communication unit arranged for communicating via an IP connection. The device may further be arranged for transmitting, in response to a first test signal, a second test signal via the IP connection.

The monitoring device may further comprise a loudspeaker for rendering sound received via the IP connection and/or a camera for transmitting images via the IP connection.

The user device preferably is a portable user device, such as a smartphone, a so-called tablet device or a laptop computer, but may also be constituted by other device, such as a desktop computer.

The present invention also provides a software program product for carrying out a method as defined above. The software program product may be stored on a tangible carrier, such as a DVD or a USB stick. Alternatively, the software program product may be stored on a server from which it may be downloaded using the Internet. The software program product contains software instructions which can be carried out by the processor of a device, such as a server, a user device (for example a smartphone), and/or a monitoring device.

BRIEF DESCRIPTION OF THE DRAWINGS

The present invention will further be explained with reference to exemplary embodiments illustrated in the drawings, in which.

DETAILED DESCRIPTION OF THE EMBODIMENTS

The present invention will be explained below with reference to a baby monitor. It will be understood that the invention is not limited to monitoring babies and that it may be applied to other categories of people, for example people who are ill, elderly people, people suffering from dementia, people suffering from another disease, etc. The present invention may also be used to monitor animals, in particular pets, such as dogs, cats, birds and rabbits. It will further be understood that the term IP connection or Internet connection must be interpreted in a broad manner and may include WLAN (for example Wi-Fi) and/or 2G/3G/4G/5G and further connections.

Figure 1:
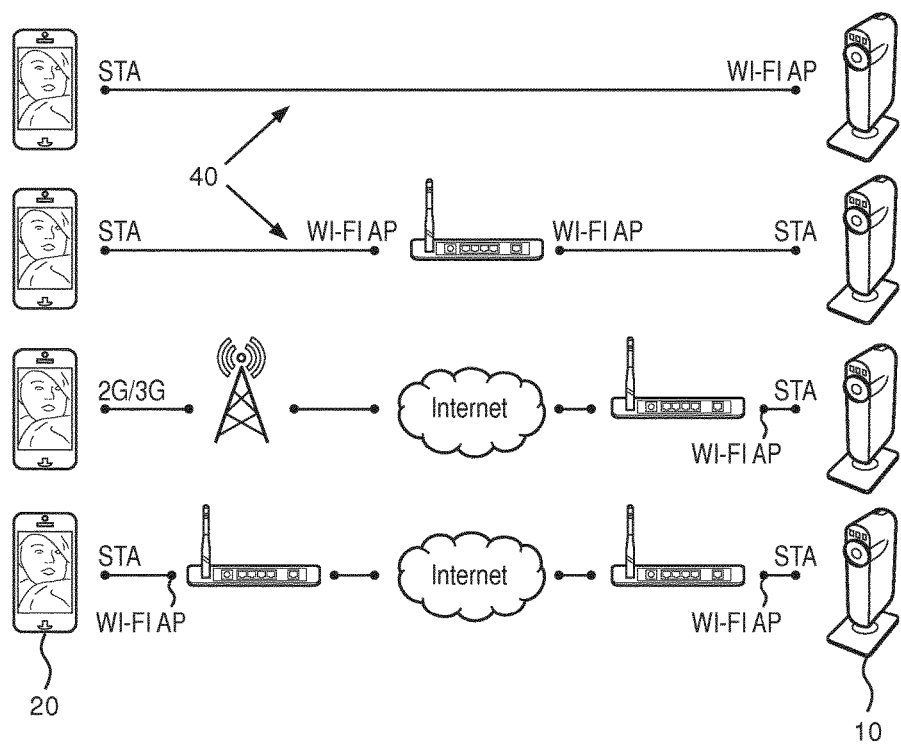
FIG. 1 schematically shows part of a monitoring system using an internet connection, in which monitoring system the present invention can be utilized, FIG. 2A schematically shows a first embodiment of a monitoring system according to the present invention, FIG. 2B schematically shows a second embodiment of a monitoring system according to the present invention, FIG. 3 schematically shows an embodiment of a first test protocol according to the present invention, FIG. 4 schematically shows an embodiment of a second test protocol according to the present invention, FIG. 5 schematically shows an embodiment of a user device as may be used in the present invention, and FIG. 6 schematically shows an embodiment of a monitoring device as may be used in the present invention.

The monitoring systems which are schematically illustrated in FIG. 1 each comprise a monitoring device 10, a user device 20 and an internet type connection 40. In the first system, the connection 40 consists of a (direct) Wi-Fi connection. The second system includes a router, while the third system involves a connection via the internet and via a telephone (2G, 3G or 4G) connection. The fourth system involves Wi-Fi connections between the devices and routers at both ends, while the routers are connected via the Internet. In all four systems, the monitoring device 10 is a device provided with a microphone and an optional camera which is placed near the person (or animal, or object) to be monitored. The user device 20 is, in the embodiments shown, constituted by a smartphone, but may be replaced with a tablet computer, a laptop computer or another device capable of running suitable software programs.

In operation, the monitoring device 10 detects sound produced by the person being monitored. Typically, a sound threshold is used, preventing background noise to be transmitted to the user device 20. Sound having a volume higher than the threshold value is then transmitted to the user device 20, where it is reproduced. The absence of sound at the user device 20 should therefore indicate that the person being watched is not producing any sound. However, it may also mean that the internet type connection 40 fails.

The present invention therefore provides a check of the connection 40 which may result in an alarm or alert if the connection fails. An exemplary embodiment of a system according to the present invention is schematically illustrated in FIG. 2A.

Figure 2A:
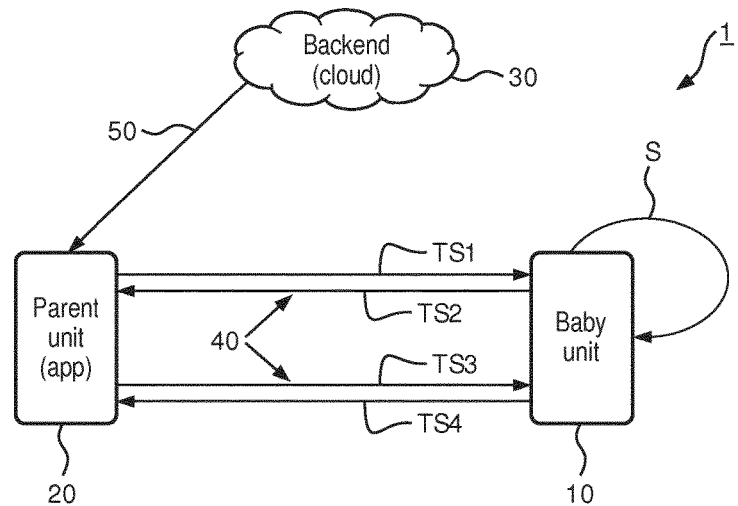

The exemplary system 1 of FIG. 2A also comprises a monitoring device (also referred to as "baby unit") 10 and a user device (also referred to as "parent unit") 20, connected by an Internet type connection 40. A software program or "app" is executed by the user device 20 and serves, among other things, to render sound transmitted by the monitoring device 10. The user device 20 can be connected to a server (located, in the present example, in the backend or "cloud" 30) via a further internet type connection 50. These connections may be referred to as first internet connection 40 and second internet connection 50 respectively.

In accordance with the present invention, the (first) connection 40 between the monitoring device 10 and the user device 20 is regularly tested by the user device 20, when initiated by the server 30. To this end, the software program running on the processor of the user device 20 at certain time intervals (for example regularly) executes a testing protocol. In a preferred embodiment:

the user device 20 sends, via the IP connection, a first test signal TS1 to the monitoring device 10, the monitoring device 10, in response to the first test signal, sends a second test signal TS2 to the user device 20, and the user device 20, in response to the second test signal, provides a positive status indication and, in the absence of the second test signal within a predetermined time duration, providing a negative status indication.

That is, if no second test signal is received back within a certain time frame, the status of the connection is deemed to be negative. In response to a negative status, an alarm or alert (auditory, visual and/or otherwise) is preferably generated. It will be understood that, if no second test signal is received, the first test signal may be repeated one or more times. The test is preferably also repeated when a second test signal is received, for example every minute, every 30 seconds or every 5 minutes. The alarm or alert may involve sending a text message (for example an SMS (Short Message Service) type message) to another user device, for example another smartphone or regular mobile telephone device.

The exemplary test protocol described above tests the connection. In order to also test the monitoring device, the testing protocol may further comprise:

the user device 20 sends, via the IP connection, a third test signal TS3 to the monitoring device 10, the monitoring device 1, in response to the third test signal TS3, produces a test sound S, the monitoring device 10, in response to registering the test sound with its microphone 11, sending a fourth test signal TS4 to the user device 20, and the user device 20, in response to the fourth test signal, providing a positive status indication and, in the absence of the fourth test signal within a predetermined time duration, providing a negative status indication.

That is, the user device causes the monitoring device to produce a sound and checks whether the sound (denoted S in FIG. 2A) is detected and received back by the user device. As with the first test signal, sending the third test signal may be repeated when no fourth signal is received. In addition, the test may be repeated as desired, for example every 30 minutes, every hour or every two hours.

The test sound preferably has a predetermined intensity, duration and/or frequency distribution, which parameters may be chosen in such a way that they produce a reliable test without disturbing the person(s) being monitored, so without waking a sleeping baby, for example.

Instead of, or in addition to, producing a test sound, the monitoring device may, in response to the third test signal, temporarily lower a sound detection threshold. This allows a test sound having a lower volume to be used, or to use background noise as test signal, thus avoiding the production of a sound altogether.

Although it is possible to let the user device initiate the test protocol (or protocols) autonomously, this has disadvantages, especially when the user device is a smartphone. Some smartphone manufacturers do not allow software programs to run in the background. In addition, running a background program is energy consuming, which is a disadvantage for all battery-powered devices.

In accordance with embodiments of the present invention, therefore, a test protocol is initiated by the server, and more in particular by a software program running on a server, as will later be explained in more detail with reference to FIG. 4. As shown in FIG. 2A, a "back-end" server may be located "in the cloud" or elsewhere and be connected with the user device 20 by a (preferably wireless) connection 50. The software "in the cloud" is arranged to initiate a test protocol, preferably regularly (although random intervals may, for example, also be used).

Accordingly, the software program on the (remote) server repeatedly sends, via the connection 50, an initiation signal to the user device 20, which in response starts a test protocol. By remotely initiating the test protocol by another device, it is no longer necessary for the user device (e.g. smartphone) to permanently run a program.

It is noted that the server-based program preferably initiates both the connection check (first and second test signal) and the system check (third and fourth test signal) including the sound signal denoted S in FIG. 2A. The server-based program may be arranged for logging test results, but this is typically not required.

Figure 2B:
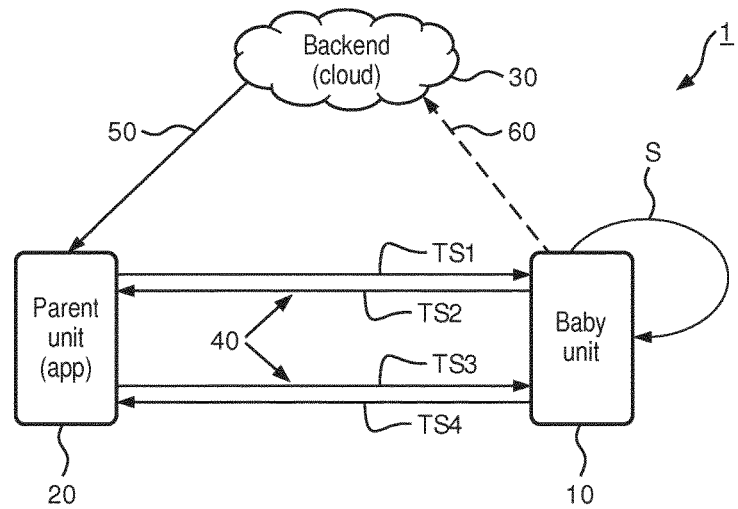

In the embodiment of FIG. 2B, the system of the invention also comprises a monitoring device (or "baby unit") 10, a user device (or "parent unit") 20, and a server 30. The monitoring device 10 and the user device 20 are capable of establishing a first internet type connection 40 while the user device 20 and the server 30 are capable of establishing a second internet type connection 50, as in FIG. 2A. However, in the embodiment of FIG. 2B, the monitoring device 10 is additionally capable of establishing a third internet type connection 60 with the server 30. This temporary (or, in some embodiments permanent) third IP connection 60 serves to allow the monitoring unit 10 to trigger the server 30 to initiate the test protocol (a so-called startup event which starts up the server initiation). In other words, in the embodiment of FIG. 2B the server may initiate the test protocol not only autonomously, but also when triggered by the monitoring unit.

The monitoring unit 10 may trigger the server 30 for example when the monitoring unit detects a sound. In response to detecting a sound, the monitoring unit may use or establish the (first) connection 40 with the user device 20, but may also trigger the server 30 to test the connection 40. In this way, any malfunctioning of the (first) connection 40 is detected quicker and the user may be alerted sooner. Thus, the reliability of the system is increased by using the additional (or third) connection 60.

It is noted that the (first) connection 40 can be a permanent internet type connection, such as a WLAN connection, and that the monitoring unit 10 and the user device 20 can permanently or intermittently transmit to maintain this connection 40. However, in some embodiments the (first) connection 40 may be a non-permanent connection which is only established when data need to be transmitted. Such data may be test data contained in test signals, or sound and/or image data, for example. In such an embodiment, therefore, the monitoring device and the user device only transmit occasionally, for example at regular intervals for test purposes and at random intervals when driven by sound and/or video data. Such an embodiment offers the advantage that the monitoring device emits significantly less radiation, which not only saves energy but also reduces concerns about any harmful effects of radiation.

Figure 3:
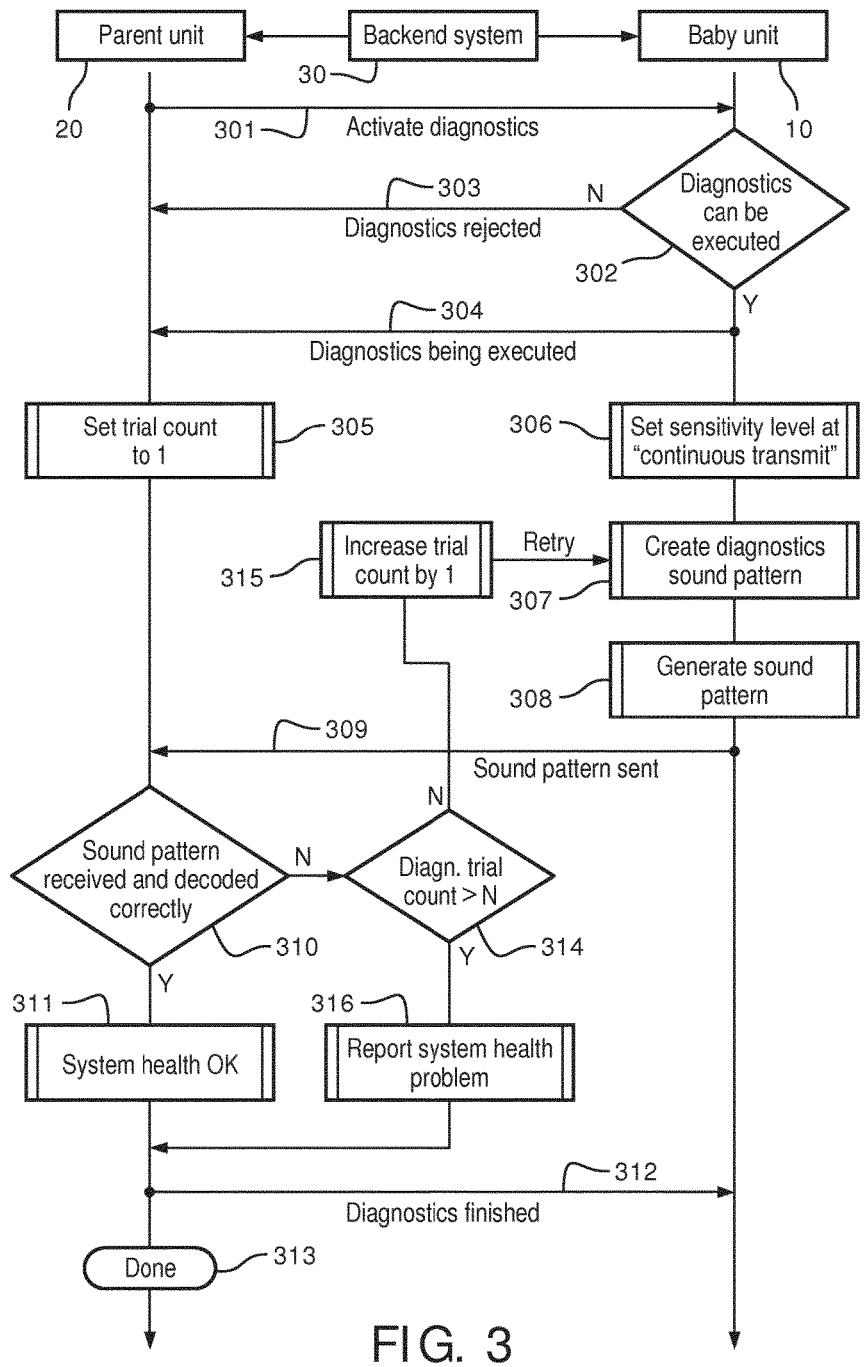

A first exemplary embodiment of a test protocol is schematically shown in FIG. 3. The test protocol shown involves an exchange of signals or messages between the user device 20 ("parent unit") and the monitoring device ("baby unit") 10. In accordance with the invention, the test protocol is initiated by a software program running on a (remote) server, which starts a test protocol in the user device. As mentioned above, the monitoring device 10 may, in some embodiments, trigger the server to initiate the test protocol.

In a first step 301, the diagnostics function of the monitoring device 10 is activated by a signal (TS1 in FIGS. 2A & 2B) from the user device 20. After a preliminary test 302 in which is determined whether the diagnostics protocol (which may also be referred to as test protocol) can be carried out (if not, this is reported back to the user device in step 303; the diagnostics being executed may be reported back in step 304), the sensitivity level (sound threshold) of the monitoring device is adjusted in step 306 so as to ensure that any sound registered by the monitoring device will be transmitted. It is noted that this step 306 is optional and that another sensitivity level may be used. Then a diagnostic sound pattern is created and generated in steps 307 and 308 respectively. If registered by the microphone of the monitoring device, the sound will be sent to the user device 20 in step 309 and optionally decoded and checked in step 310 to ensure that the correct sound has been received.

If it is concluded in step 310 that the sound is correctly received and decoded, then it is concluded in step 311 that the system status (or system health) is normal (OK) and the test protocol finishes ("Done") in step 313. In an optional step 312 the normal health status may be reported to the monitoring device 10 to conclude its test protocol, If it is concluded that the sound is not correctly received and decoded, then a number of retries is attempted. A trial count is initially set to 1 in step 305. In step 314, which is executed when it is concluded in step 310 that the sound pattern was not received and decoded correctly, it is checked whether the diagnostics trial count exceeds a predetermined number N (for example 2, 5, 10 or 50).

If the maximum number of trials N is not exceeded, the trial count is increased by 1 in step 315 and a retry is executed by returning to step 307, in which a diagnostic sound pattern is produced.

If the maximum number of trials N (; and/or a maximum time period) is exceeded without a proper received and decoded sound signal, then it is concluded in step 316 that the test failed and that the system status is not normal. This may then be brought to the attention of the user. In general, in particular if the sound test is used, the status of the monitoring device may be permanently made available to the user. The test protocol then also finishes at step 313.

Figure 4:
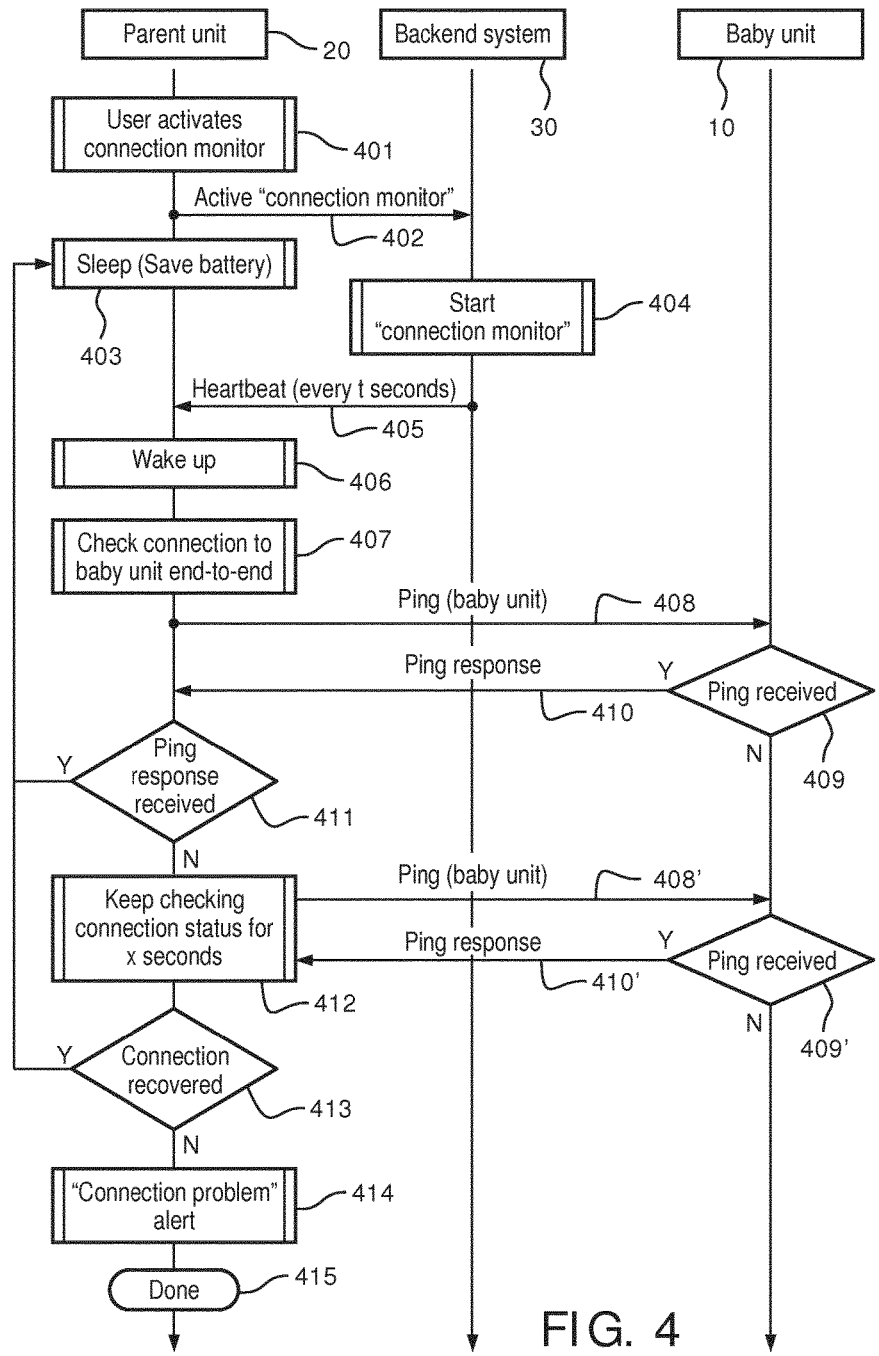

A second exemplary embodiment of a test protocol is schematically shown in FIG. 4. The exemplary "connection monitor" test protocol of FIG. 4 involves a monitoring device ("baby unit") 10, a user device ("parent unit") 20 and a server ("backend system") 30.

In this second embodiment, the "connection monitor" software program (app) on the user device 20 is activated in step 401. This activation may be initiated by the user, or be carried out automatically by the user device, for example in response to switching from a WLAN/Wi-Fi network to a 3G or 4G network. In step 402, the user device notifies the server 30 that the user device app is active, and in response the connection monitor software program in the server is activated. This user initiated activation may be done once, or every time the monitoring system is used. After activating the server in step 402, the user device 20 enters in step 403 a hibernation mode to save energy.

It is noted that the notification of the server in step 402 is optional and that embodiments can be envisaged in which this notification is absent. Embodiments can be envisaged in which the server searches for active connection monitor apps.

In response to the activation in step 403, the server or "back-end system" 30 starts producing an initiation (or "heartbeat") signal at certain intervals. Although regular intervals are preferred, for example every 30 seconds, or 10 or 30 minutes, random or semi-random intervals may also be used. The heartbeat signal is sent to the user device in step 405.

In response to the heartbeat signal, the user device 20 is activated in step 406 and starts testing the connection in step 407. This may be done by sending a test signal or "ping" (TS1 in FIGS. 2A & 2B) to the monitoring device 10 in step 408. is the monitoring device is arranged to check in step 409 whether a test signal was received, and to return a test signal (TS2 in FIGS. 2A & 2B) in response in step 410 if the check was positive. If the user device receives this response, which is checked in step 411, then it determines that the connection status is normal and the software program returns to step 403 (hibernation mode). If it is determined that the user device did not receive this response, then in step 412 the test may be repeated (steps 408', 409' and 410') a number of times and/or during a certain time interval. Then it is determined in step 413 whether the connection has been recovered, that is, whether a return test signal (ping response) has been received. If it is determined that the connection has been recovered, then the protocol continues with step 403. If the proper response is still not received after the maximum number of retries and/or if the time interval has expired, then an alert is produced in step 414 and the protocol ends in step 415.

Figure 5:
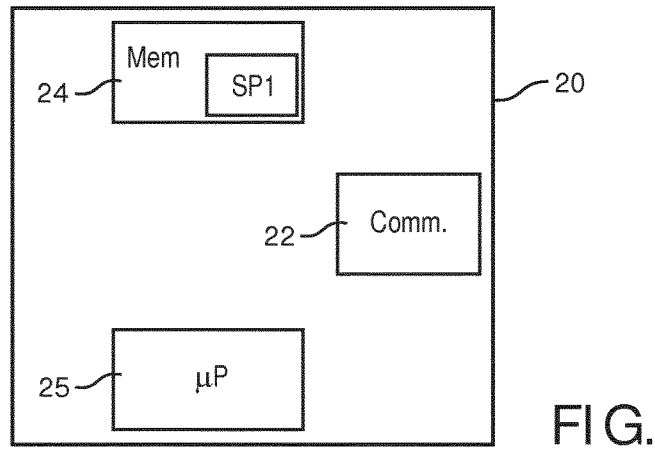

The user device 20 schematically illustrated in FIG. 5 comprises a communication unit 22, a memory 24 and a microprocessor 25. These units may be connected by a data bus (not shown). The communication unit 22 is preferably arranged for wireless communication using the TCP/IP protocol and/or similar Internet-type protocols. The memory 24 stores a software program SP1 containing instructions which cause the microprocessor 25 to carry out the present invention, in particular but not exclusively the test protocol. The user device 20 may comprise other components, such as a screen, which are not shown in FIG. 5 for the sake of clarity of the illustration. As mentioned above, the user device preferably is a portable user device, such as a smartphone, a so-called tablet device or a laptop computer, but may also be constituted by other device, such as a desktop computer.

Figure 6:
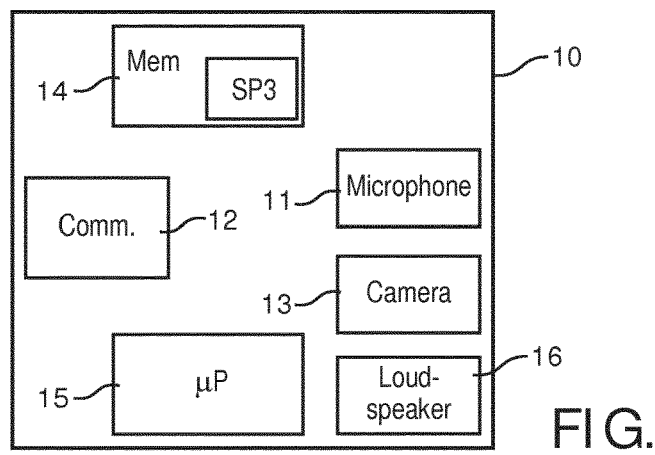

The monitoring device 10 schematically illustrated in FIG. 6 comprises a microphone 11, a communication unit 12, a camera 13, a memory unit 14, a microprocessor 15 and a loudspeaker 16. These units may be connected by a data bus (not shown). The communication unit 12 is preferably arranged for wireless communication using the TCP/IP protocol and/or similar Internet-type protocols. The memory 14 stores a software program SP2 containing instructions which cause the microprocessor 15 to carry out the present invention, in particular but not exclusively the test protocol. The monitoring device 10 may comprise other components, which are not shown in FIG. 6 for the sake of clarity of the illustration. It will be understood that in some embodiments, certain components may be omitted. For example, not all embodiments may include a camera. Similarly, not all embodiments may include a microphone.

Although the monitoring device 10 typically is a dedicated device, embodiments can be envisaged in which the monitoring device 10 is (also) constituted by a smartphone. In such embodiments, the software program SP3 is also a so-called app.

It is further envisaged that the user device, in particular the app on the smartphone, indicates the status of the connection between the monitoring device and the smartphone. Depending on the (partial) status of parts of the connection (for example from monitoring device to router via Wi-Fi, from router to 4G antenna via IP/fiber cable, from 4G antenna to smartphone over 4G), a combined status may be given in which each partial status is taken into account. The status may be indicated by a color code, a symbol, or a combination of both. The user device may present an alarm when the IP connection is lost. The alarm may involve a sound (such as a beep and/or a spoken message), a visual alarm (such as a symbol which may or may not flash), a tangible alert (such as a vibration), or any desired combination thereof.

Figure 7:
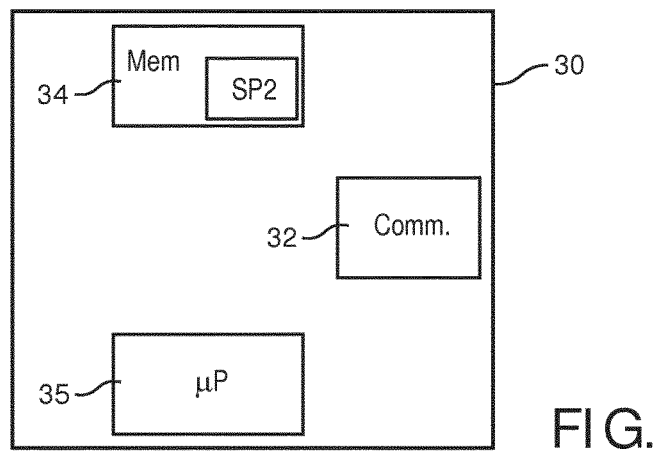
FIG. 7 schematically shows an embodiment of a server device as may be used in the present invention.

The server device 30 schematically illustrated in FIG. 7 comprises a communication unit 32, a memory 34 and a microprocessor 35. These units may be connected by a data bus (not shown). The communication unit 32 is preferably arranged for wireless communication using the TCP/IP protocol and/or similar Internet-type protocols. The memory 24 stores a software program SP2 containing instructions which cause the microprocessor 35 to carry out the present invention, in particular but not exclusively the initiation of the test protocol in the user device 20. The server 30 may comprise other components, such as a screen, which are not shown in FIG. 7 for the sake of clarity of the illustration.

The present invention is based upon the insight that when using a non-active connection between a monitoring device and a user device, such as a smartphone, the user device must actively check the connection status. The present invention is also based upon the further insight that when using a smartphone to check a connection status, it is advantageous to let a server application activate an app on the smartphone. The present invention benefits from the further insight that checking the status of an internet-type connection between a monitoring device and a smartphone may be accomplished by prompting the monitoring device to produce a suitable sound, or by lowering the sound detection threshold to the point where background noise leads to a sound detection. The present invention also benefits from the still further insight that the above-mentioned connection checking may alternatively be carried out by prompting the monitoring device to carry out a test which does not include producing a sound, that is, by carrying out a "silent test", and preferably to provide feedback on that test.

It will be understood that the description of the invention given above is not intended to limit the invention in any way. Singular nouns and the articles "a" and "an" are of course not meant to exclude the possibility of plurals. Devices mentioned in this document, such as smartphones, may be replaced with their successors, even if these successors are not yet known at the time of writing. As is well established in the law of patents, the abstract should never be used to limit the scope of the claims, and neither should reference numbers in the claims.

It will therefore be understood by those skilled in the art that the present invention is not limited to the embodiments mentioned above and that many additions and modifications are possible without departing for the scope of the invention as defined in the appending claims.

The invention claimed is:

1. A system for monitoring living beings, the system comprising:
   a monitoring device, in a vicinity of the monitored living being, comprising a microphone for detecting and registering sound and a communication unit configured to communicate via an Internet Protocol (IP) connection;
   a remote user device, programmed with a first software program for rendering sound corresponding to the registered sound registered by the microphone of the monitoring device and transmitted via the IP connection; and
   a server configured to communicate with the user device via a further IP connection, wherein the server is programmed with a second software program for periodically initiating, through the first software program in the user device, a protocol for testing the IP connection between the monitoring device and the user device.

2. The system according to claim 1, wherein the second software program, upon each activation of the first software program, transmits instructions to the remote user device for carrying out the protocol.

3. The system according to claim 1, wherein the protocol includes:
   the remote user device sending, via the IP connection, a first test signal to the monitoring device,
   the monitoring device, in response to the first test signal, sending a second test signal to the remote user device, and
   the remote user device, in response to the second test signal, providing a positive status indication and, in the absence of the second test signal within a predetermined time duration, providing a negative status indication.

4. The system according to claim 1, wherein the protocol includes:
the remote user device sending, via the IP connection, a third test signal to the monitoring device,
the monitoring device, in response to the third test signal, producing a test sound,
the monitoring device, in response to registering the test sound with microphone of the monitoring device, sending a fourth test signal to the remote user device, and
the remote user device, in response to the fourth test signal, providing a positive status indication and, in the absence of the fourth test signal within a predetermined time duration, providing a negative status indication.

5. The system according to claim 4, wherein the test sound has a predetermined intensity, duration and/or frequency distribution.

6. The system according to claim 4, wherein the test sound has a pattern which is decoded in the remote user device to ensure that a correct test sound is received by the remote user device.

7. The system according to claim 1, wherein the protocol includes:
the remote user device sending, via the IP connection, a third test signal to the monitoring device,
the monitoring device, in response to the third test signal, performing a test without producing a sound,
the monitoring device, if the test is successful, sending a fourth test signal to the remote user device, and
the remote user device, in response to the fourth test signal, providing a positive status indication and, in the absence of the fourth test signal within a predetermined time duration, providing a negative status indication.

8. The system according to claim 1, wherein the protocol includes:
the remote user device sending, via the IP connection, a third test signal to the monitoring device,
the monitoring device, in response to the third test signal, temporarily lowering a sound detection threshold,
the monitoring device, in response to detecting a sound with its microphone at the lowered sound detection threshold, sending a fourth test signal to the remote user device, and
the remote user device, in response to the fourth test signal, providing a positive status indication and, in the absence of the fourth test signal within a predetermined time duration, providing a negative status indication.

9. The system according to claim 1, wherein the monitoring device is arranged to discontinue the IP connection between the monitoring device and the remote user device in the absence of sound to be transmitted.

10. A system for monitoring living beings, the system comprising:
a monitoring device, in a vicinity of the monitored living being, comprising a microphone for detecting and registering sound and a communication unit configured to B communicate via an Internet Protocol (IP) connection,
a remote user device, programmed with a first software program for rendering sound corresponding to the registered sound registered by the microphone of the monitoring device and transmitted via the IP connection; and
a server configured to communicate with the user device via a further IP connection, wherein the server is programmed with a second software program for periodically initiating, through the first software program in the user device, a protocol for testing the IP connection between the monitoring device and the user device,
wherein the monitoring device is configured for transmitting, in response to a first test signal, a second test signal via the IP connection, indicating a status of the IP connection.

11. The system according to claim 10, wherein the monitoring device is further configured for, in response to a third test signal, producing a test sound and, in response to registering the test sound with the microphone, sending a fourth test signal over the IP connection.

12. The system according to claim 11, wherein the monitoring device is further configured for, in response to the third test signal, temporarily lowering a sound detection threshold.

13. The system according to claim 10, wherein the monitoring device further comprises a loudspeaker for rendering sound received via the IP connection and/or a camera for transmitting images via the IP connection.

14. A method for monitoring a living being, the method comprising: detecting and registering sound using a monitoring unit located in a vicinity of the monitored living being, and communicating the registered sound via an IP connection to a remote user device; rendering the registered sound using the remote user device; and periodically initiating, through the remote user device, a protocol for testing the IP connection between the monitoring unit and the remote user device, the protocol comprising: sending, via the IP connection, a first test signal to the monitoring device from the remote user device; in response to the first test signal, sending a second test signal to the remote user device from the monitoring device; and in response to the second test signal, providing a positive status indication and, in the absence of the second test signal within a predetermined time duration, providing a negative status indication by the remote user device.

15. A non-transitory computer readable storage medium for storing computer code that, when executed by a computer processor, carries out the method for monitoring a living being, according to claim 14.

* * * * *